(12) United States Patent
Yoshida

(10) Patent No.: US 7,215,699 B2
(45) Date of Patent: May 8, 2007

(54) PATH TIMING DETECTION METHOD, PATH TIMING DETECTION APPARATUS, AND ADAPTIVE ARRAY ANTENNA SYSTEM

(75) Inventor: Shousei Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 760 days.

(21) Appl. No.: 10/440,153

(22) Filed: May 19, 2003

(65) Prior Publication Data

US 2003/0220082 A1 Nov. 27, 2003

(30) Foreign Application Priority Data

May 21, 2002 (JP) ............................. 2002-146813

(51) Int. Cl.
*H04B 1/00* (2006.01)
*H03D 1/04* (2006.01)

(52) U.S. Cl. ...................... 375/147; 375/148; 375/346; 375/348

(58) Field of Classification Search ................ 375/316, 375/343, 147, 150, 152, 346, 348, 349
See application file for complete search history.

(56) References Cited

U.S. PATENT DOCUMENTS

| 6,282,229 | B1 | 8/2001 | Aoyama |
| 6,466,166 | B2 | 10/2002 | Nakagawa |
| 6,492,958 | B2 | 12/2002 | Yoshida |
| 6,882,681 | B2 | 4/2005 | Sano |
| 6,914,932 | B1 * | 7/2005 | Miya et al. ................. 375/150 |
| 7,010,023 | B1 | 3/2006 | Sato |
| 7,088,956 | B2 * | 8/2006 | Kishigami et al. ............ 455/65 |
| 2002/0181561 | A1 * | 12/2002 | Sano .......................... 375/148 |
| 2003/0012267 | A1 * | 1/2003 | Jitsukawa et al. .......... 375/148 |
| 2003/0210670 | A1 * | 11/2003 | Kisigami et al. ........... 370/335 |

FOREIGN PATENT DOCUMENTS

| CN | 1327317 A | 12/2001 |
| JP | 2000-022587 | 1/2000 |
| JP | 2000-022587 A | 1/2000 |
| JP | 2001-036451 A | 2/2001 |
| JP | 2001-308764 A | 11/2001 |
| JP | 2002-077008 | 3/2002 |

* cited by examiner

*Primary Examiner*—Chieh M. Fan
*Assistant Examiner*—Jason M. Perilla
(74) *Attorney, Agent, or Firm*—Foley & Lardner LLP

(57) ABSTRACT

To provide a path timing detection method for an adaptive array antenna system realizing improved path timing detection characteristics and high-quality demodulation results by simple processing. A sliding correlator despreads signals from antennas over a plurality of chip timings. A multibeam former forms a plurality of directional beams from outputs of the sliding correlator. A per-beam delay profile generation means generates a delay profile averaged in a certain cycle with respect to each beam by using the signal sequences of the beams from the multibeam former. A path timing detection means detects path timings one after another from the generated delay profiles with respect to the respective beams by using a minimum selection timing interval centered on a chip timing already selected as a path timing and a minimum selection beam interval centered on the beam having the chip timing already selected.

6 Claims, 8 Drawing Sheets

PATH TIMING DETECTION METHOD, PATH TIMING DETECTION APPARATUS, AND ADAPTIVE ARRAY ANTENNA SYSTEM

BACKGROUND OF THE INVENTION

1. Field of the Invention

The present invention relates to path timing detection in an adaptive array antenna system and, more particularly, to a path timing detection method, a path timing detection apparatus and an adaptive array antenna system in which code division multiple access (CDMA) signals are received by an array antenna and path timings are detected by using signals obtained by multibeam reception.

2. Description of the Related Art

Code division multiple access (CDMA) has the potential for increasing the number of subscribers in a communication system and is therefore considered a promising wireless access method for mobile communication cellular system. However, user signals access a base station simultaneously with a desired user signal and interfere with the desired user signal. A technique using an adaptive array antenna is used to eliminate such interference in a spatial region.

In an adaptive array antenna system, signals are received by a plurality of antennas, a directional beam is formed by combining the received signals in a complex number weighted combination manner, a desired user signal is thereby received while interference of other user signals is suppressed.

In a CDMA mobile communication system, there is a need to ascertain, in a reception and demodulation section, timings of paths included in a multipath which occurs from a propagation environment for a signal, and which are necessary for reception and demodulation of the signal, and a path timing detection section is therefore provided. A path timing detection section in an adaptive array antenna system detects a plurality of path timings before reception and demodulation and notifies a reception and demodulation section of the detected timings. The reception and demodulation section despreads received signals by the notified path timings, forms a user-specific directional beam from the signals, and combines path signals (by rake combining) to finally obtain demodulation results.

In a multiple antenna system such as an adaptive array antenna system, the ratio of signal power to interference noise power (signal to interference noise ratio: SINR) per antenna decreases in proportion to the number of antennas. Therefore a deterioration in path detection characteristics, particularly a reduction in SINR occurs if path timing detection is performed by using a received signal from only one antenna. As a method devised by considering this problem, a method of performing path timing detection by using signals received with a plurality of antennas is known. An example of a system for performing path timing detection by this method is one described in Japanese Patent Laid-open Publication No. 2000-22587 "Spread Spectrum Signal Receiving Method and Receiver". This system is arranged to improve detection characteristics in such a manner that delay profiles are formed on an antenna-by-antenna basis and are combined to obtain a smoothed delay profile.

FIG. 7 is a diagram showing an example of a configuration of a conventional path timing detection apparatus and adaptive array antenna system.

The conventional adaptive array antenna system has a path timing detection section 101 and a reception and demodulation section 106. The path timing detection section 101 has means for detecting path timings by receiving code division multiple access (CDMA) signals by an array antenna, i.e., a sliding correlator 102, a per-antenna delay profile generation means 103, a delay profile combining means 104, and a path timing detection means 105.

The sliding correlator 102 despreads signals from antennas at a resolution of $1/N_R$ ($N_R$: an integer equal to or larger than 1) of the chip period over a plurality of chip timings, and outputs despread signal sequences. The per-antenna delay profile generation means 103 averages in a certain period each of the signal sequences from the sliding correlator 102 to generate a delay profile with respect to each antenna. The delay profile combining means 104 combines the delay profiles generated by the means 103 to generate one resultant delay profile. The path timing detection means 105 detects, on the basis of the one resultant delay profile, a plurality of path timings to be used in the reception and demodulation section 106.

FIG. 8 is a diagram for explaining the operation of the conventional path timing detection means 105. For detection of path timings, a detection method of selecting chip timings with a high level from one delay profile from the delay profile combining means 104 is used. Since narrow-band frequency band limitation is ordinarily performed in the CDMA system, a signal in one path appears by spreading over a plurality of chip timings. A method is therefore adopted in which, in the process of selecting chip timings with a high level one after another from a delay profile, the path timing detection means 105 sets a chip timing interval 121 centered on a chip timing already selected as a path timing (hereinafter referred to as "minimum selection timing interval"), and does not select chip timings less than the minimum selection timing interval 121 in path timing detection subsequently performed.

That is, referring to FIG. 8, if $N_R$ is 4 and if the minimum selection timing interval 121 is ±4 chip timings (one chip period), a chip timing 6 with a highest level is selected as a first path timing. Chip timings less than the minimum selection timing interval 121 are excluded in path timing detection subsequently performed. That is, chip timings 3, 4, 5, 7, 8, and 9 on the opposite sides of the chip timing 6 are excluded. Next, a chip timing 13 is selected as a second path timing, and chip timings 10, 11, 12, 14, 15, and 16 on the opposite sides of the chip timing 13 are excluded. In this processing, chip timing 5, for example, exists with a level higher than that with which chip timing 13 exists, but it is regarded as a spread of the first path and is not selected. The same path timing detection processing is subsequently repeated. An interval defined by ±3 or ±4 chip timings is suitably set as minimum selection timing interval 121 when $N_R=4$.

The reception and demodulation section 106 has means for receiving code division multiple access (CDMA) signals by the array antenna and demodulating path signals by detected path timings, i.e., L number of path receiving means 107-1 to 107-L corresponding to the number of multipath propagation paths, and one combiner 111. The path receiving means 107-1 to 107-L have correlators 108-1 to 108L, beam formers 109-1 to 109-L, rake combining weighting means 110-1 to 110-L, and antenna weight control means 112-1 to 112-L.

The correlators 108-1 to 108-L despread spread signals by path timings detected by the path timing detection section 101 in correspondence with the paths. The beam formers 109-1 to 109-L form antenna directional beams from outputs of the correlators 108-1 to 108-L in correspondence with the paths by using user-specific antenna weights adaptively generated. The rake combining weighting means 110-1 to 110-L weight beam outputs corresponding to the paths to make compensation for carrier phase variations and to maximize the SINR after combining (to achieve maximum-ratio combination). The antenna weight control means 112-1 to 112-L compute antenna weights by using the despread signals from the correlators 108-1 to 108-L.

As antenna weight control means 112-1 to 112-L, a method of computing antenna weights such that beams are directed to paths on the basis of estimation of the arrival angles of the paths and a method of using an adaptive algorithm such as that for minimum-mean-squared error (MMSE) control are known. For example, an MMSE method is described in Japanese Patent Laid-open Publication No. 2002-77008 "Adaptive Antenna Receiver". The combiner 111 adds together outputs from the rake combining weighting means 110-1 to 110-L and outputs high-quality demodulation results obtained by combining the paths.

The path timing detection apparatus in the conventional adaptive array antenna system shown in FIG. 7 is arranged to improve detection characteristics by improving path timing discrimination in such a manner that level combining (amplitude or power combining) of delay profiles corresponding to respective antennas is performed to obtain a smoothed delay profile.

However, this method only reduces the spread of each of the peak level and the noise level of delay profiles with respect to paths and does not immediately improve the SINR (the difference between the peak level and the noise level). In particular, if the number of antenna elements included in the array antenna is increased, the SINR per antenna is reduced and peaks in paths do not appear distinctively. Thus, there is a limit to the improvement in characteristics based on delay profile combining.

SUMMARY OF THE INVENTION

In view of the above-described problems, an object of the present invention is to provide a path timing detection method for an adaptive array antenna system realizing improved path timing detection characteristics and high-quality demodulation results by simple processing, and a path timing detection apparatus and an adaptive array antenna system in which processing according to the path timing detection method is performed.

Another object of the present invention is to provide a path timing detection method for an adaptive array antenna system realizing improved path timing detection characteristics and high-quality demodulation results in such a manner that delay profiles are formed on a beam-by-beam basis from signals obtained by multibeam reception and having an improved SINR, and path timings are detected with reliability from chip timings in delay profiles with respect to all beams while the influence of path spreading is eliminated, and a path timing detection apparatus and an adaptive array antenna system in which processing according to the path timing detection method is performed.

Still another object of the present invention is to provide a path timing detection method for an adaptive array antenna system realizing improved path timing detection characteristics and high-quality demodulation results in such a manner that delay profiles are formed on a beam-by-beam basis from signals obtained by multibeam reception and having an improved SINR, and path timings are detected on the basis of a minimum selection timing interval and a minimum selection beam interval, and a path timing detection apparatus and an adaptive array antenna system in which processing according to the path timing detection method is performed.

According to a first aspect of the present invention, a path timing detection method in which code division multiple access signals are received by an array antenna and path timings are detected, the method comprising:

a step of despreading the signals over a plurality of chip timings and outputting despread signal sequences;

a step of forming a plurality of directional beams from the despread signal sequences and outputting signal sequences of the respective beams;

a step of generating delay profiles with respect to the respective beams from the signal sequences of the respective beams; and a step of selecting the path timings one after another from chip timings in all the delay profiles.

In the step of selecting the path timings, when the path timings are selected one after another, chip timings less than a minimum selection timing interval centered on a chip timing already selected as the path timing and chip timings less than the minimum selection timing interval in each of the beams less than a minimum selection beam interval centered on the beam having the chip timing already selected are not selected in path timing detection subsequently performed.

According to a second aspect of the present invention, a path timing detection apparatus which receives code division multiple access signals by an array antenna and detects path timings, the apparatus comprising:

first means for forming a plurality of directional beams based on the signals and generating delay profiles with respect to the respective beams; and second means for selecting the path timings one after another from chip timings in all the delay profiles.

The second means does not select chip timings less than a minimum selection timing interval centered on a chip timing already selected as the path timing and chip timings less than the minimum selection timing interval in each of the beams less than a minimum selection beam interval centered on the beam having the chip timing already selected.

According to a third aspect of the present invention, an adaptive array antenna system comprising a path timing detection section in which code division multiple access signals are received by an array antenna and path timings are detected, and a reception and demodulation section in which reception and demodulation are performed, the path timing detection section having:

a sliding correlator which despreads the signals over a plurality of chip timings, and which outputs despread signal sequences;

a multibeam former which forms a plurality of directional beams from the despread signal sequences, and which outputs signal sequences of the respective beams;

per-beam delay profile generation means for generating delay profiles with respect to the respective beams from the signal sequences of the respective beams; and path timing detection means for selecting the path timings one after another from chip timings in all the delay profiles and outputting the path timings to the reception and demodulation section.

The path timing detection means does not select chip timings less than a minimum selection timing interval centered on a chip timing already selected as the path timing and chip timings less than the minimum selection timing interval in each of the beams less than a minimum selection beam interval centered on the beam having the chip timing already selected.

DETAILED DESCRIPTION OF THE PREFERRED EMBODIMENTS

Figure 1:
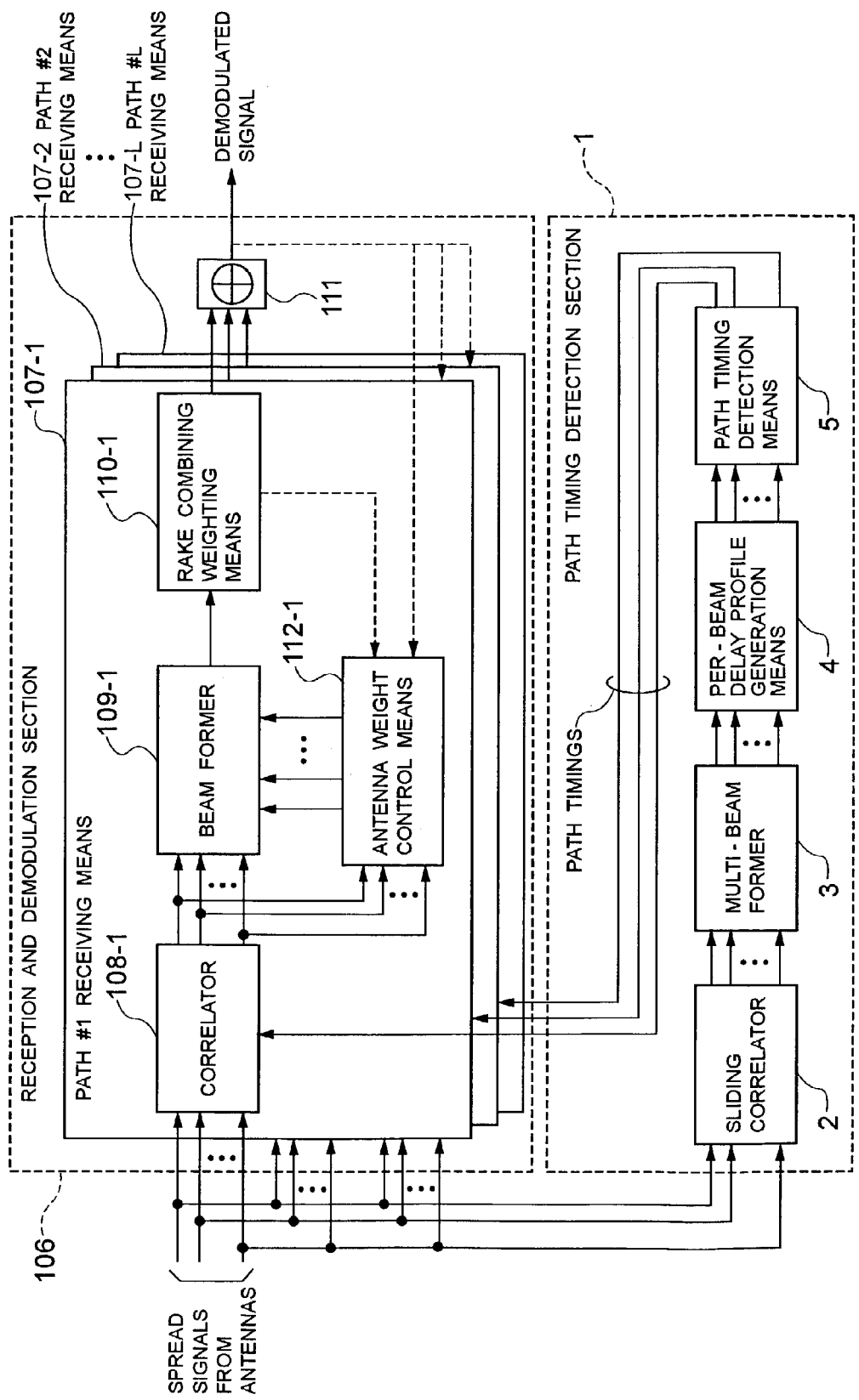
FIG. 1 is a block diagram showing an embodiment of the present invention.

FIG. 1 is a diagram showing an embodiment of the present invention. A path timing detection apparatus and an adaptive array antenna system according to the embodiment of the present invention have a path timing detection section 1 and a reception and demodulation section 106. The path timing detection section 1 has a sliding correlator 2, a multibeam former 3, a per-beam delay profile generation means 4, and a path timing detection means 5.

The sliding correlator 2 despreads signals from respective antennas at a resolution of $1/N_R$ ($N_R$: an integer equal to or larger than 1) of the chip period over a plurality of chip timings, and outputs despread signal sequences. The multibeam former 3 forms a plurality of directional beams from outputs of the sliding correlator 2, and outputs signal sequences of the respective beams.

Figure 2:
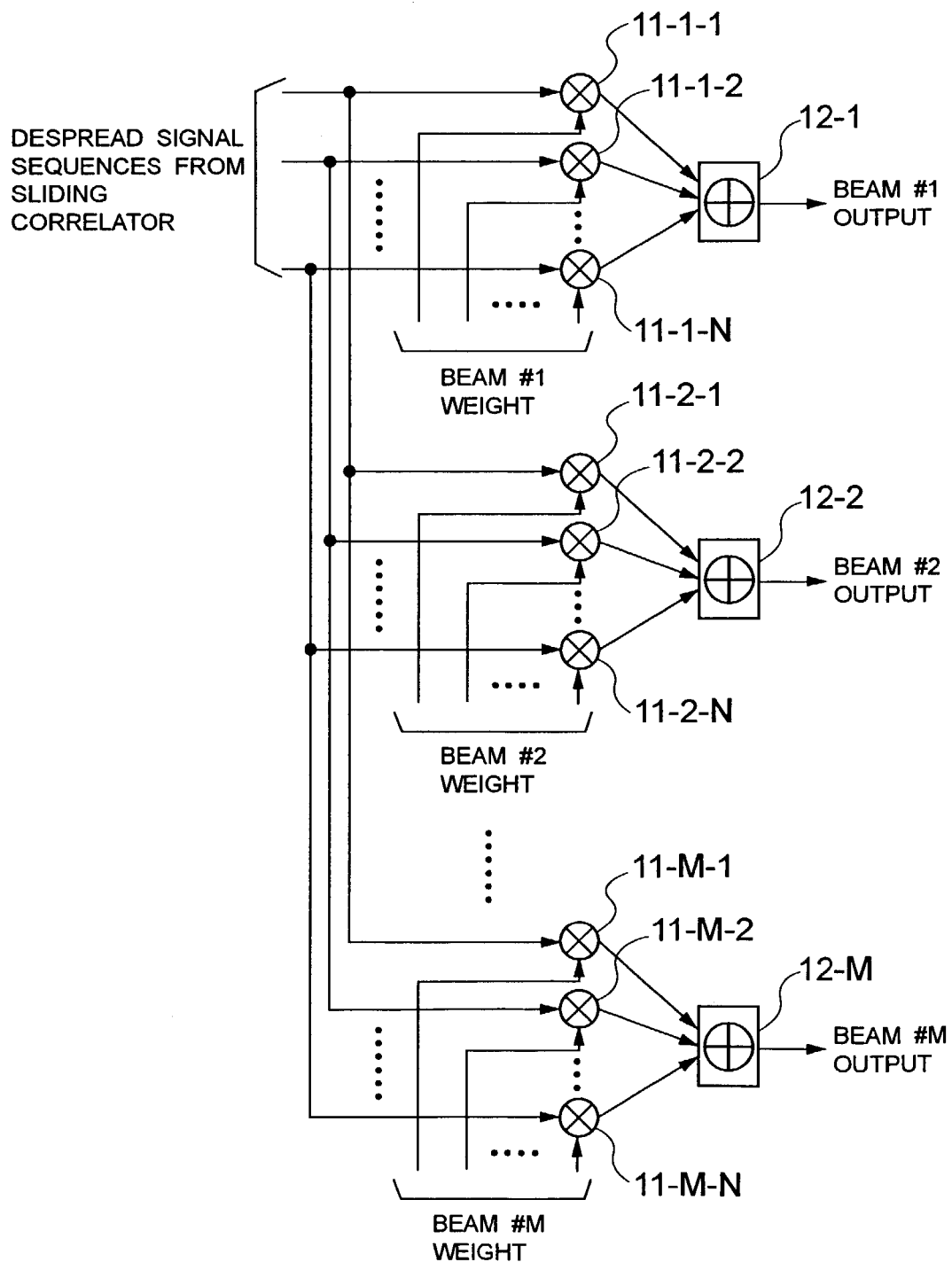
FIG. 2 is a block diagram showing the configuration of a multibeam former according to the embodiment of the present invention.

FIG. 2 is a diagram showing the configuration of the multibeam former 3. The multibeam former 3 has multipliers 11-1-1 to 11-1-N, . . . , 11-M-1 to 11-M-N each of which weighs the signal sequences from the sliding correlator 2 with M beam weights, where M is an integer larger than or equal to 1, and M number of combiners 12-1 to 12-M each of which add together N number of outputs from the multipliers 11-1-1 to 11-1-N, . . . , or 11-M-1 to 11-M-N, where N is an integer larger than or equal to 1.

Figure 4A:
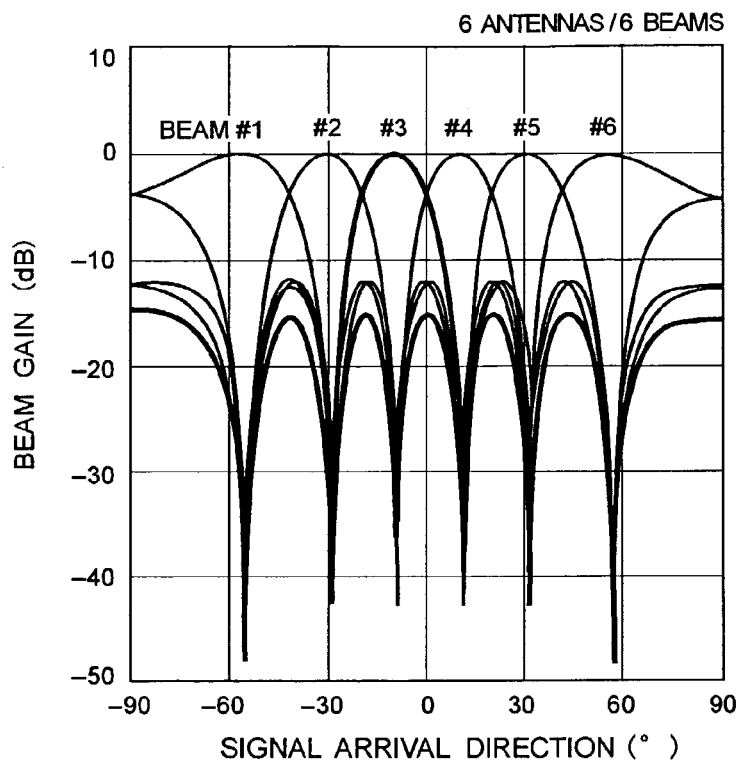
FIGS. 4A and 4B are diagrams showing examples of multibeam patterns according to the embodiment of the present invention.
Figure 4B:
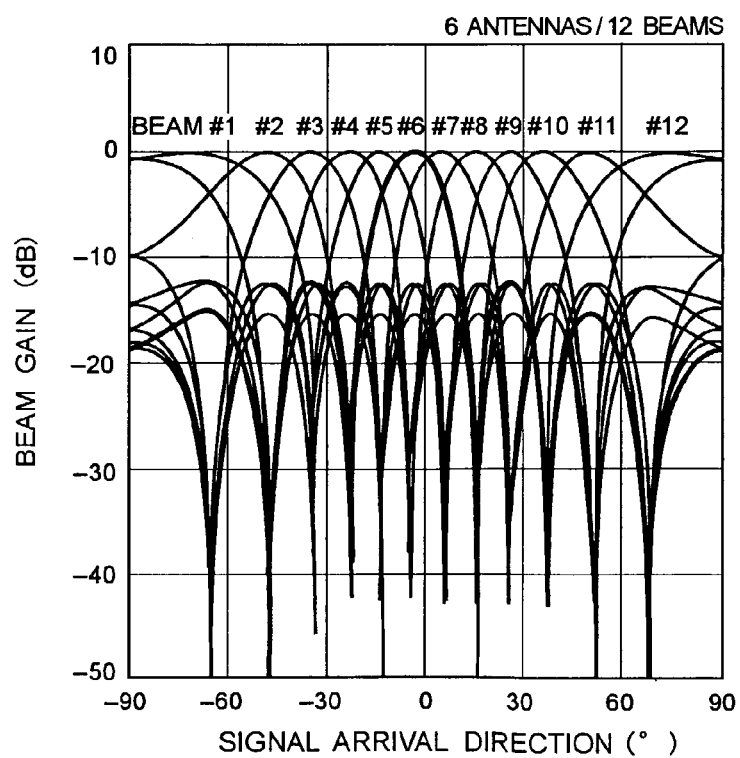

FIGS. 4A and 4B are diagrams showing examples of directional beam patterns formed by the multibeam former 3. With respect to an antenna configuration in which six antennas are arranged in a straight row, FIG. 4A shows a 6-beam orthogonal multibeam pattern, and FIG. 4B shows a 12-beam pattern formed by interpolating beams between the beams shown in FIG. 4A. The per-beam delay profile generation means 4 averages in a certain period each of the signal sequences from the multibeam former 3 to generate a delay profile with respect to each beam.

Figure 3:
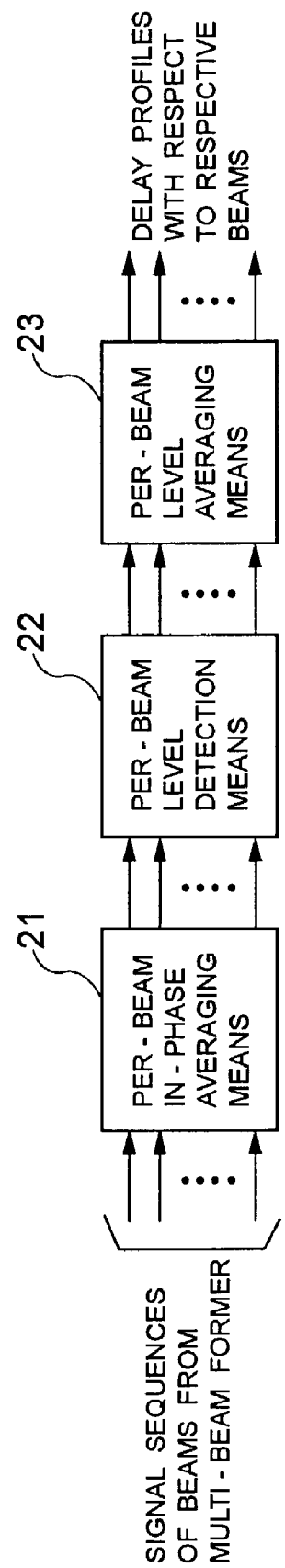
FIG. 3 is a block diagram showing the configuration of per-beam delay profile generation means according to the embodiment of the present invention.

FIG. 3 is a diagram showing the configuration of the per-beam delay profile generation means 4. The per-beam delay profile generation means 4 has a per-beam in-phase averaging means 21 for in-phase vector-averaging of a predetermined number of symbols of each signal sequence from the multibeam former 3, a per-beam level detection means 22 for detecting the level (amplitude or power) of each output of the means 21, and a per-beam level averaging means 23 for averaging in a predetermined time respective outputs of the per-beam level detection means 22 and generating delay profiles with respect to the respective beams.

The per-beam in-phase averaging means 21 effectively improves the SINR by performing vector addition of despread symbols while phase-matching the symbols. If the symbols are modulated, this operation cannot be performed unless the symbols are demodulated. However, if pilot signals are used, the demodulation may be removed by known pilot symbols to enable in-phase addition. If the number of symbols in-phase averaged is larger, the SINR can be improved more effectively. However, if rapid phase change occurs due to fading, the number of symbols to be averaged is limited. The number of symbols averaged by the per-beam in-phase averaging means 21 and the method of average-weighting by this means may be freely selected.

The per-beam in-phase averaging means 21 may be placed for antenna-by-antenna operation before the multibeam former 3 for the purpose of reducing the amount of computation performed by the multibeam former 3. Also in such a case, the same principle applies and the present invention comprises such an arrangement. On the other hand, level averaging by the per-beam level averaging means 23 is effective in smoothing delay profiles and the time period for which the per-beam level averaging means 23 performs averaging is maximized as long as any change in path timing can be followed. The averaging time of the per-beam level averaging means 23 and the method of average-weighting by this means may be freely selected. The path timing detection means 5 detects, on the basis of the delay profiles generated by the means 4, a plurality of path timings to be used in the reception and demodulation section 106.

Figure 5:
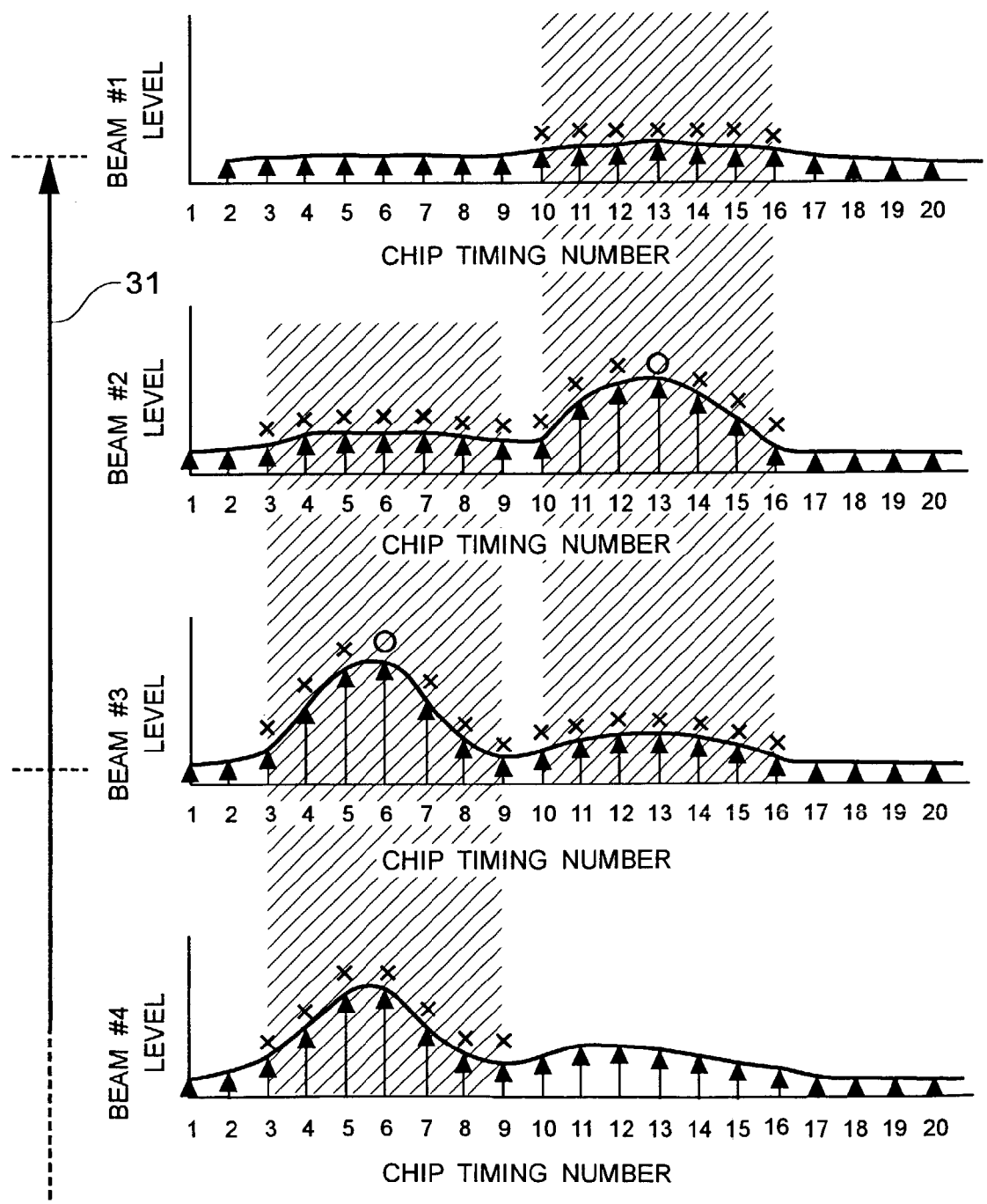
FIG. 5 is a diagram for explaining the operation of path timing detection means according to the embodiment of the present invention.

FIG. 5 is a diagram for explaining the operation of the path timing detection means 5. In a CDMA system in which narrow-band frequency band limitation is performed, a signal in one path appears by spreading over a plurality of chip timings, as described above with respect to the operation of the conventional path timing detection means 105. In the case of the present invention including forming delay profiles on a beam-by-beam basis, a signal in one path appears by spreading over a plurality of beams as well as spreading over a plurality of chip timings. In the case where the orthogonal multibeam shown in FIG. 4A is used, when a path arrives along a direction between two of the beams, the path appears in the two beam outputs. In the case where the interpolated multibeam shown in FIG. 4B is used, a path appears in two or three beam outputs. If the number of interpolated beams is increased, the number of beams in which one path appears becomes larger.

In the path timing detection means 5, a path timing detection method is therefore adopted in which, in the process of selecting chip timings with a high level one after another from the delay profiles with respect to all the beams, the path timing detection means 5 does not select chip timings less than a minimum selection timing interval 121 centered on a chip timing already selected as a path timing in path timing detection subsequently performed, and in which the path timing detection means 5 sets a beam interval 31 centered on the beam having the chip timing already selected (hereinafter referred to as "minimum selection beam interval"), and does not select, in path timing detection subsequently performed, chip timings less than the minimum selection timing interval 121 in each of the delay profiles with respect to the beams less than the minimum selection beam interval 31.

This path timing detection method will be described with reference to FIG. 5. If $N_R$ is 4; the minimum selection timing interval 121 is ±4 chip timings (the 4-chip-timing interval corresponds to one chip period (one code period of PN code)); and the minimum selection beam interval 31 is ±2 beams, a chip timing 6 in the beam #3 with a highest level is selected as a first path timing. Chip timings less than the minimum selection timing interval 121 are excluded in path timing detection subsequently performed. That is, chip timings 3, 4, 5, 7, 8, and 9 on the opposite sides of the chip timing 6 in the beam #3 are excluded. Also, chip timings less than the minimum selection timing interval 121 in each of the delay profiles with respect to the beams less than the minimum selection beam interval 31 are excluded. That is, chip timings 3, 4, 5, 6, 7, 8, and 9 in each of the beams #2 and #4 are excluded. Next, a chip timing 13 in the beam #2 is selected as a second path timing, and chip timings 10, 11, 12, 14, 15, and 16 on the opposite sides of the chip timing 13 are excluded. Also, chip timings 10, 11, 12, 13, 14, 15, and 16 in each of the beams #1 and #3 are excluded. The same processing is subsequently repeated to detect paths of path receiving means 107-1 to 107-L.

In this processing, in the case of FIG. 5, chip timing 5 in the beam #3 exists with a level higher than that with which chip timing 13 in the beam #2 exists, but it is regarded as a spread of the first path and is not selected. Similarly, chip timing 5 in the beam #4 exists with a level higher than that with which chip timing 13 in the beam #2 exists, but it is regarded as a spread of the first path and is not selected. As a result, chip timing 6 and chip timing 13 are selected. The same path timing detection processing is subsequently repeated. An interval defined by ±3 or ±4 chip timings is suitably set as minimum selection timing interval 121 when $N_R=4$. In the case where the interpolated multibeam shown in FIG. 4B are used, an interval defined by ±2 or ±3 beams is suitably set as minimum selection beam interval 31.

Figure 6:
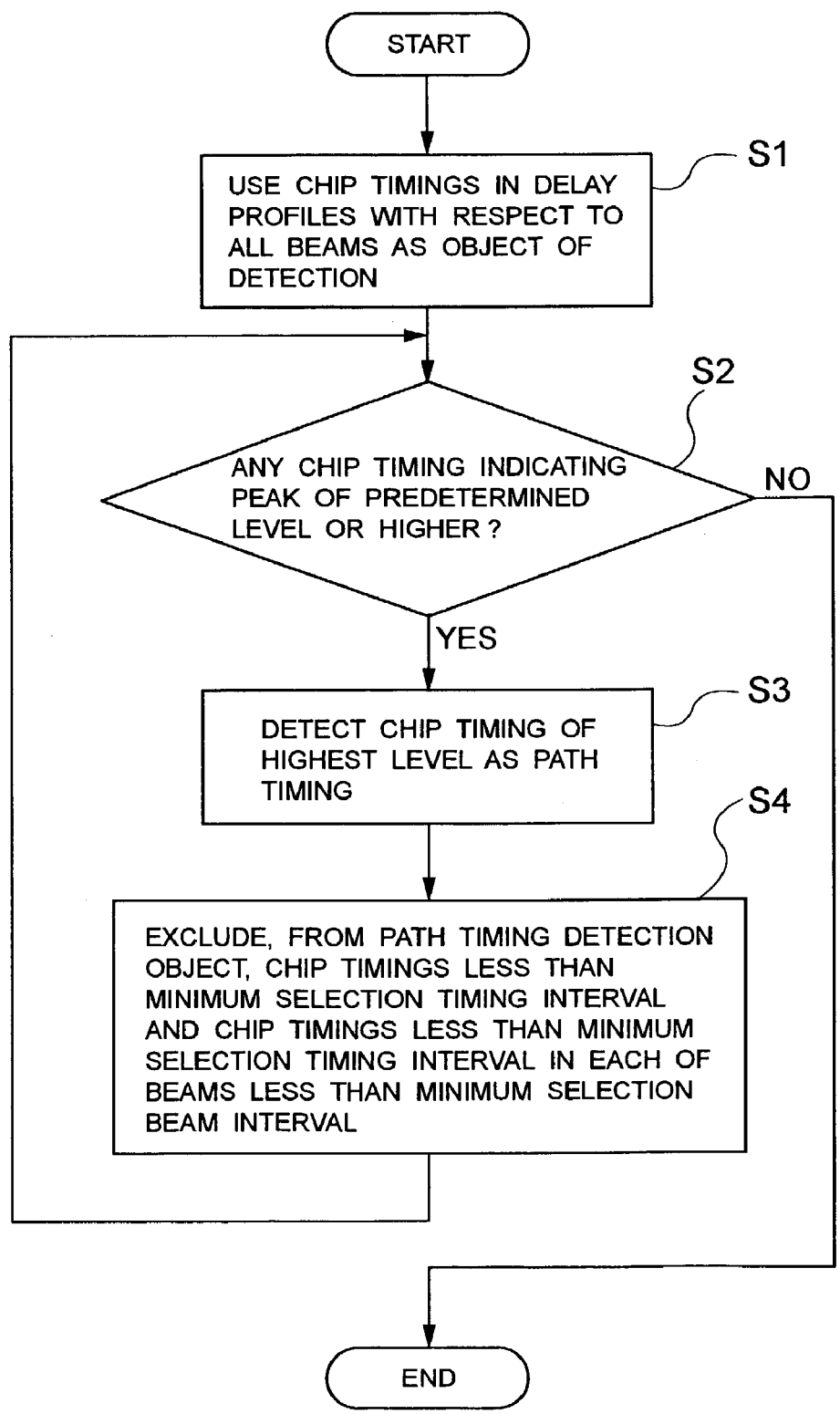
FIG. 6 is a diagram showing an example of a processing flow of path timing detection according to the embodiment of the present invention.
Figure 7:
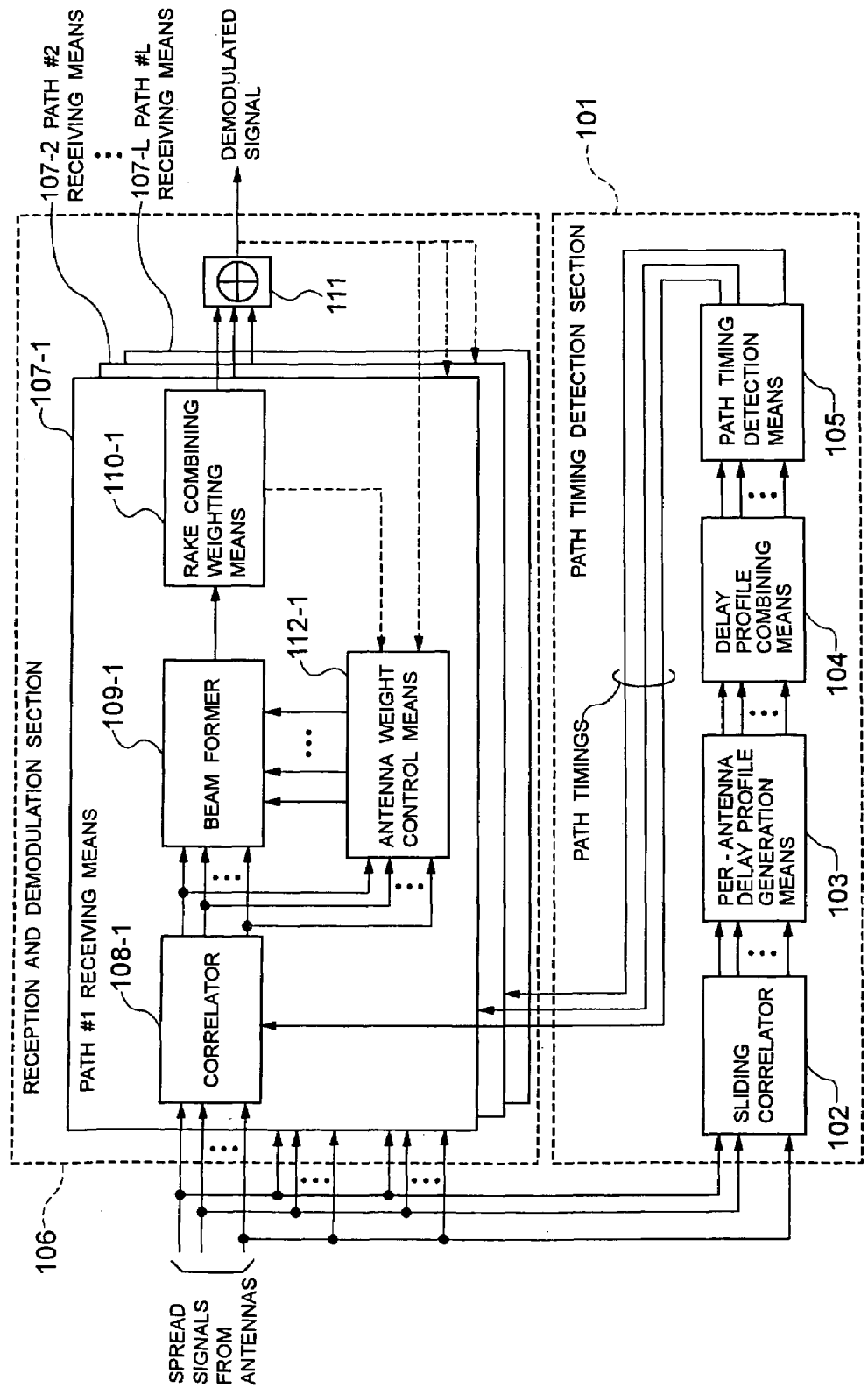
FIG. 7 is a diagram showing a path timing detection apparatus in a conventional adaptive array antenna system.
Figure 8:
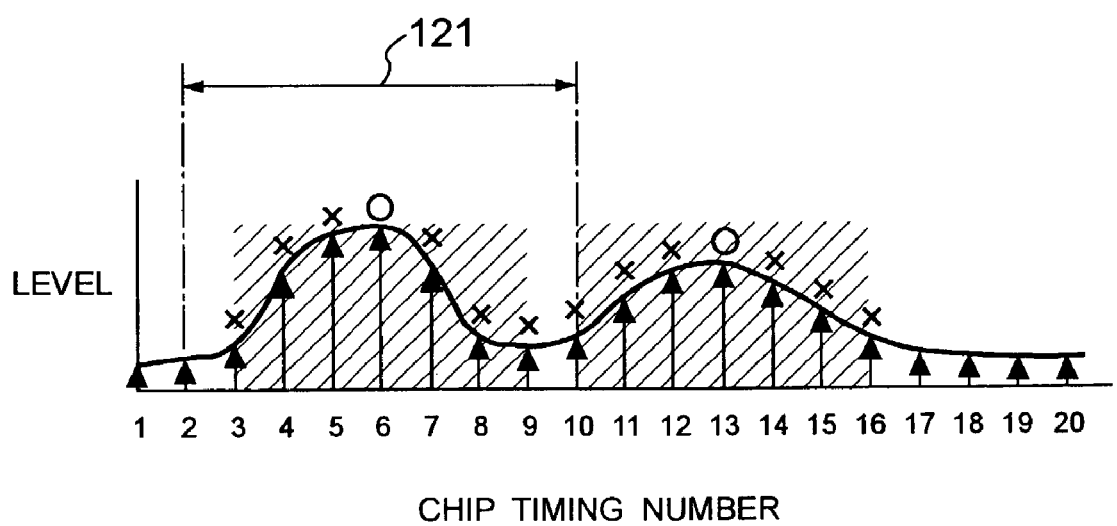
FIG. 8 is a diagram for explaining the operation of the conventional path timing detection means.

FIG. 6 is a diagram showing an example of a processing flow in the path timing detection method according to the embodiment of the present invention. Chip timings in delay profiles with respect to all beams are selected as objects from which path timings will be selected (step s1). If chip timings indicating peaks of a predetermined level or higher exists (step s2), the chip timing having the highest level is selected as a path timing (step s3). Chip timings in the delay profiles with respect to all the beams other than the chip timings less than the minimum selection timing interval centered on the selected chip timing (path timing) and the chip timings less than the minimum selection timing interval in each of the delay profiles with respect to the beams less than the minimum selection beam interval centered on the beam having the selected chip timing (path timing) are selected as objects from which path timings will be selected (step s4). The processing from the step s2 is repeated to detect path timings in the path receiving means.

The reception and demodulation section 106 has the same configuration as that in the conventional adaptive array antenna system. That is, the reception and demodulation section 106 has means for receiving code division multiple access (CDMA) signals by the array antenna and demodulating path signals by detected path timings, i.e., L number of path receiving means 107-1 to 107-L corresponding to the number of multipath propagation paths, and one combiner 111.

The path receiving means 107-1 to 107-L have correlators 108-1 to 108L, beam formers 109-1 to 109-L, rake combining weighting means 110-1 to 110-L, and antenna weight control means 112-1 to 112-L. The correlators 108-1 to 108-L despread spread signals by path timings detected by the path timing detection section 1 in correspondence with the paths. The beam formers 109-1 to 109-L form antenna directional beams from outputs of the correlators 108-1 to 108-L in correspondence with the paths by using user-specific antenna weights adaptively generated. The rake combining weighting means 110-1 to 110-L weight beam outputs corresponding to the paths to make compensation for carrier phase variations and to maximize the SINR after combining (to achieve maximum-ratio combination). The antenna weight control means 112-1 to 112-L compute antenna weights by using the despread signals from the correlators 108-1 to 108-L.

As antenna weight control means 112-1 to 112-L, a method of computing antenna weights such that beams are directed to paths on the basis of estimation of the arrival angles of the paths and a method of using an adaptive algorithm such as that for minimum-mean-squared error (MMSE) control are known. For example, an MMSE method is described in Japanese Patent Laid-open Publication No. 2002-77008 "Adaptive Antenna Receiver". The combiner 111 adds together outputs from the rake combining weighting means 110-1 to 110-L and outputs high-quality demodulation results obtained by combining the paths.

According to the embodiment of the present invention, path timings are detected by directly using all delay profiles with respect to respective beams on the basis of signals obtained by multibeam reception and having an improved SINR, and improved path timing detection characteristics can therefore be realized. Also, detection of path timings based on the delay profiles with respect to the respective beams is performed on selected chip timings by considering the influence of path spreading due to frequency band limitation or the like in the CDMA system, thereby reliably avoiding an error in path timing detection. In particular, path timing detection is performed by using the minimum selection timing interval in chip timings and the minimum selection beam interval in beams. Thus, path timing detection can be performed by simple algorithms with reliability.

What is claimed is:

1. A path timing detection method in which code division multiple access signals are received by an array antenna and path timings are detected, said method comprising:

a step of despreading the received signals over a plurality of chip timings and outputting despread signal sequences;

a step of forming a plurality of directional beams from the despread signal sequences and outputting signal sequences of the respective beams;

a step of generating delay profiles with respect to the respective beams from the signal sequences of the respective beams; and a step of selecting path timings one after another from chip timings in all the delay profiles, wherein, in said step of selecting the path timings, chip timings within a minimum selection timing interval corresponding to ±Nr chip timings centered about a chip timing already selected as a one of the path timings and chip timings within the minimum selection timing interval in each beam within a minimum selection beam interval corresponding to ±Nb beams centered about the beam associated with the one of the chip timings already selected are not selected in path timing detection subsequently performed, wherein Nr is an integer greater than or equal to one, and wherein Nb is an integer greater than or equal to one.

2. A path timing detection apparatus which receives code division multiple access signals by an array antenna and detects path timings, said apparatus comprising:
first means for forming a plurality of directional beams based on the received signals and generating delay profiles with respect to the respective beams; and
second means for selecting path timings one after another from chip timings in all the delay profiles,
wherein said second means does not select chip timings within a minimum selection timing interval corresponding to ±Nr chip timings centered about a chip timing already selected as one of the path timings and chip timings within the minimum selection timing interval in each beam within a minimum selection beam interval corresponding to ±Nb beams centered about the beam associated with the one of the chip timings already selected, wherein Nr is an integer greater than or equal to one, and wherein Nb is an integer greater than or equal to one.

3. The path timing detection apparatus according to claim 2, wherein said first means has
a sliding correlator which despreads the signals over a plurality of chip timings, and which outputs despread signal sequences,
a multibeam former which forms the plurality of directional beams from the despread signal sequences, and which outputs signal sequences of the respective beams, and
per-beam delay profile generation means for generating the delay profiles with respect to the respective beams from the signal sequences of the respective beams.

4. An adaptive array antenna system comprising a path timing detection section in which code division multiple access signals are received by an array antenna and path timings are detected, and a reception and demodulation section in which reception and demodulation are performed, said path timing detection section having:

a sliding correlator which despreads the received signals over a plurality of chip timings, and which outputs despread signal sequences;
a multibeam former which forms a plurality of directional beams from the despread signal sequences, and which outputs signal sequences of the respective beams;
per-beam delay profile generation means for generating delay profiles with respect to the respective beams from the signal sequences of the respective beams; and
path timing detection means for selecting path timings one after another from chip timings in all the delay profiles and outputting the path timings to said reception and demodulation sections,
wherein said path timing detection means does not select chip timings within a minimum selection timing interval corresponding to ±Nr chip timings centered about a chip timing already selected as one of the path timings and chip timings within the minimum selection timing interval in each beam within a minimum selection beam interval corresponding to ±Nb beams centered about the beam associated with the one of the chip timings already selected, wherein Nr is an integer greater than or equal to one, and wherein Nb is an integer greater than or equal to one.

5. The path timing detection method according to claim 1, wherein the step of forming a plurality of direction beams comprises:
multiplying the despread signal sequences with beam weights, to obtained multiplied signals; and
combining the multiplied signals to obtain the signal sequences of the respective beams.

6. The adaptive array system according to claim 4, wherein the multibeam former comprises:
a plurality of multipliers for multiplying the despread signal sequences with beam weights, to obtained multiplied signals; and
a plurality of combiners for combining the multiplied signals to obtain the signal sequences of the respective beams.

* * * * *